United States Patent

[11] 3,612,727

| [72] | Inventor | William W. Drake |
| | | Horsham, Pa. |
| [21] | Appl. No. | 867,172 |
| [22] | Filed | Oct. 17, 1969 |
| [45] | Patented | Oct. 12, 1971 |
| [73] | Assignee | Crane Co. |
| | | Warrington, Pa. |

[54] METERING PUMP
8 Claims, 4 Drawing Figs.

[52] U.S. Cl. ............................................. 417/388,
417/395
[51] Int. Cl. ............................................. F04b 9/08,
F04b 35/02, F04b 43/06
[50] Field of Search ........................................ 417/388,
395

[56] References Cited
UNITED STATES PATENTS
255,400 3/1882 Waring ........................ 417/297

| 1,503,634 | 8/1924 | Bucherer ........................ | 417/388 |
| 2,289,617 | 7/1942 | Wood ............................ | 417/388 X |
| 2,919,650 | 1/1960 | Wiggermann ................. | 417/380 |

*Primary Examiner*—Carlton R. Croyle
*Assistant Examiner*—Richard E. Gluck
*Attorney*—Zachary T. Wobensmith, II ABSTRACT: A metering pump is provided which uses the forward movement of a plunger reciprocating in a metering chamber to force a noncompressible fluid against one side of a flexible diaphragm, thereby moving the diaphragm forward, and which uses a spring or other resilient means on the other side of the diaphragm to move it backwards as the plunger returns, thereby providing a means to pump fluids against high differential pressures on discharge stroke but without dependence on a low pressure or vacuum in the metering chamber to return the diaphragm on the suction stroke. Structure is also provided to adjust pumping volume, to accurately make up any loss of intermediate fluid and to prevent excessive pressure buildup in the metering chamber.

INVENTOR.
WILLIAM W. DRAKE
BY G.T Wobensmith
ATTORNEY.

INVENTOR.
WILLIAM W. DRAKE
BY
ATTORNEY.

3,612,727

METERING PUMP

BACKGROUND OF THE INVENTION

1. Field of the Invention

This invention relates to a diaphragm-type metering pump that has a hydraulically actuated and spring returned diaphragm.

2. Description of the Prior Art

There has been considerable research towards developing a metering pump that is accurate, that is leakproof, that permits pumping against high pressures and that provides for change of pump feed easily and without diaphragm damage.

In this type of reciprocating plunger pump, the plunger does not contact the pumpage directly. Instead, it displaces a metered volume of noncompressible fluid (usually an oil) on each stroke. This intermediate fluid exerts equally distributed hydraulic pressure against a flexible membrane or diaphragm which is clamped around its periphery or a tubular membrane clamped at at each open end, thereby maintaining separation of the oil and pumpage. As the plunger reciprocates, the diaphragm flexes and transmits the motion of the plunger to the pumpage, thus creating pumping action. Check valves of various well-known designs are used in the pumped fluid suction and discharge lines to control pumping action. Because the unclamped diaphragm area is considerably greater than the plunger area, its travel back and forth during pumping is much less than plunger travel.

In this common type of diaphragm pump, considerable difficulty is experienced in obtaining accurate flow since return of the diaphragm on suction stroke is entirely dependent on the relationship of hydraulic pressures on either side of it. If insufficient low pressure or vacuum is not produced by the plunger on suction stroke, the diaphragm will not return sufficiently and pumping accuracy is lost. If too high a vacuum exists, air or other gages entrained in the oil will vaporize, again destroying accuracy.

Further difficulties are experienced in making up the small portion of oil lost past the plunger during its reciprocating travel. Replenishment is usually accomplished by vacuum-breaker refill valves or other mechanical means which allows oil under atmospheric pressure to enter the metering chamber when the plunger is on the suction stroke. It can be seen that the setting of the vacuum breaker cracking pressure is extremely critical, is dependent on the individual suction conditions of each application, and if improperly adjusted the conditions previously detailed are aggravated. Common types of replenishment systems can allow too much oil to enter the metering chamber as when the diaphragm does not fully return. In this case, metering accuracy is not obtained and the diaphragm can be overstressed and destroyed as a result of overtravel on the discharge stroke.

In the apparatus of the present invention the diaphragm is positively returned on the suction stroke, without mechanical connection and without dependence on pressures either in the metering chamber or in the suction system, thereby providing improved metering accuracy, longer diaphragm life and a simpler mechanism.

SUMMARY OF THE INVENTION

A metering pump is provided which utilizes a plunger displacing a column of fluid to actuate a hydraulically balanced diaphragm on the discharge stroke, the diaphragm being returned on the suction stroke by a spring located on the side of the diaphragm opposite to the actuating fluid, there being no mechanical connection or attachment to the diaphragm and the diaphragm having a preformed contour to facilitate its travel without edge or center stress normally associated with thin plate deflection stress analysis, there also being valves provided for fluid replenishment and relief of excessive fluid pressure.

The principal object of the present invention is to provide a metering pump that provides an accurate flow of pumped fluid.

A further object of the present invention is to provide a metering pump that is leak proof and capable of pumping against high differential pressures.

A further object of the present invention is to provide a metering pump that requires a minimum of maintenance and has a long service life.

A further object of the present invention is to provide a metering pump that is readily adjustable for varying the flow of the pumped liquid.

A further object of the present invention is to provide a metering pump that has a minimum of mechanical parts, requires a minimum of close alignment of contiguous parts and is of highly efficient operation.

A further object of the present invention is to provide a metering pump that can deliver a steady, unfluctuating flow of liquid when the discharge from a pair of plungers are fed to a common outlet.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
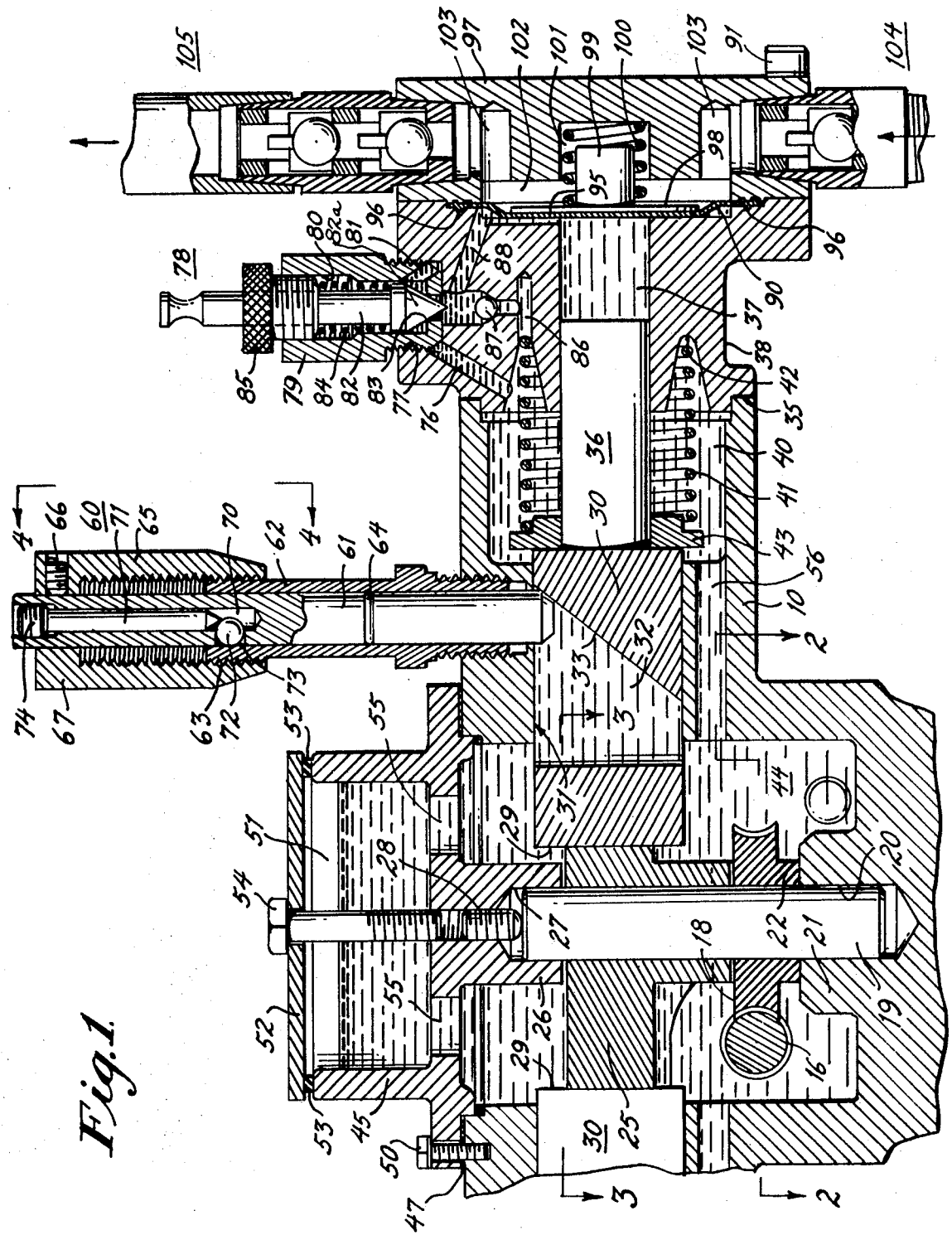
FIG. 1 is a vertical central sectional view of the apparatus of the present invention.
Figure 2:
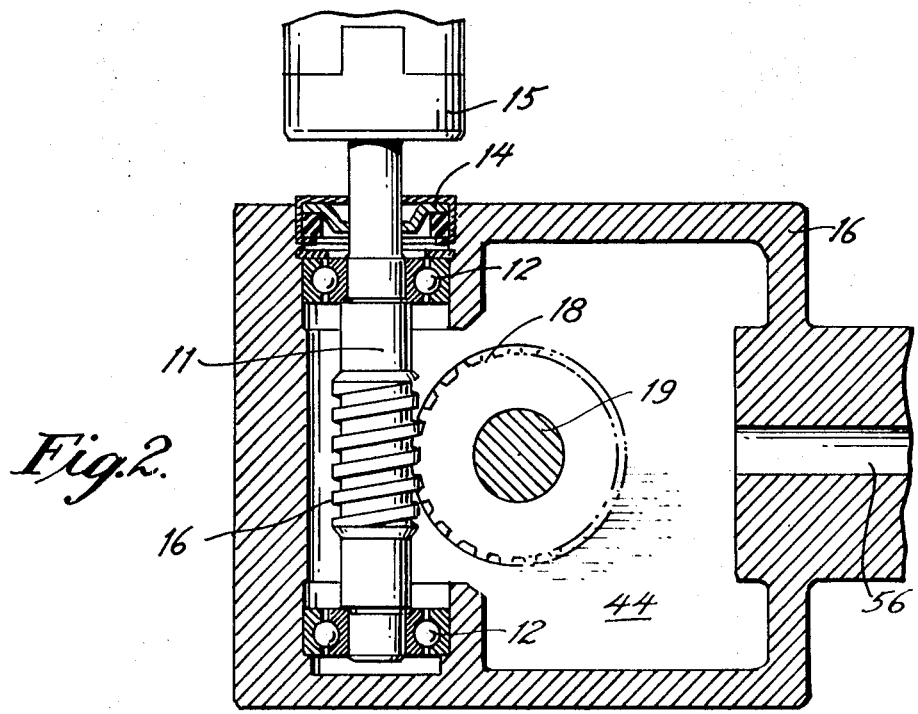
FIG. 2 is a horizontal sectional view, enlarged, taken approximately on the line 2—2 of FIG. 1.
Figure 3:
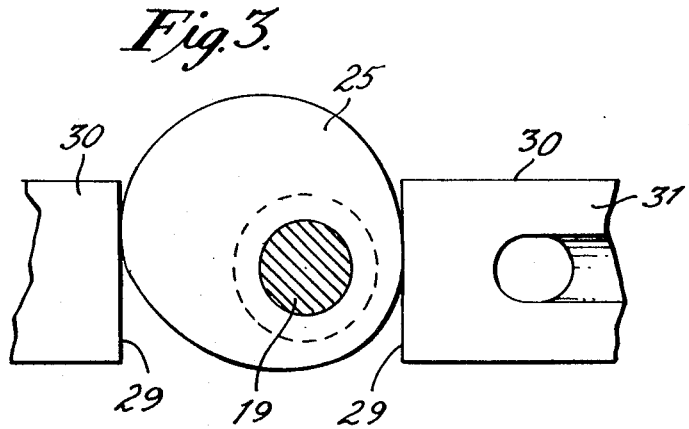
FIG. 3 is a horizontal sectional view, enlarged, taken approximately on the line 3—3 of FIG. 1.

Referring now more particularly to the drawings, the metering pump includes an outer housing 10 which, as seen in FIG. 2, has a shaft 11 therein rotatably mounted in bearings 12 and sealed by oil seal 14. A drive apparatus (not shown) is attached to shaft 11 by a coupling 15 and may be any suitable source of rotation such as an electric motor, (not shown) either fixed speed or variable speed. The shaft 11 is provided with a worm 16 which is engaged with a worm gear 18 rotatably mounted on hardened shaft 19. The shaft 19, as seen in FIG. 1, is fixed in bore 20 of boss 21 of housing 10. The gear 18 has a hub 22 which bears against boss 21 and maintains proper relationship to worm 16. Connected to the opposite side of gear 18 for movement therewith is a programmed contour face cam 25 rotatably mounted on shaft 19. The other end of shaft 19 is fixed in bore 27 of boss 26 of cover 45 which pivots into housing 10 to maintain concentricity of bores 20 and 27. A setscrew 28 is in threaded engagement in boss 26 and bears against the end of shaft 19 to position it vertically.

The face of cam 25 bears against the flat end 29 of cylindrical crosshead 30. The configuration shown in FIG. 1 illustrates a duplex pump, with identical cross heads 30 at left and right. The structure described from this point may be identical on both the left and right sides but the left side structure has been omitted. The crosshead 30 has a center portion 32 also cylindrical but slotted or cut through to provide a position limiting surface 33.

The crosshead 30, free to reciprocate in bore 31 of housing 10, bears against a plunger or piston 36 and annular ring 43 fastened to plunger 36. The plunger 36 is closely engaged in bore 37 of housing 38 which is detachably fastened to housing 10 and sealed by gasket 35. The housing 10 has a cavity 40 to the left of housing 38 which contains a compression spring 41 which bears at the left end on annular ring 43 fastened to plunger 36 and at the right end on a circular groove 42 in housing 38. Spring 41 maintains contact between plunger 36, ring 43 and crosshead 30, and between crosshead face 29 and cam 25 but is not required to exert force to produce a sufficiently low pressure in bore 37 to return diaphragm 95 on the suction stroke. Hence, spring 41 can be easily sized to produce very low stresses and not impose excessive loads on pump drive mechanism, gears 16 and 18, shafts 11 and 19, bearings 12 and cam 25.

The housing 10 at the left has an interior cavity 44 which is closed off by cover 45 which carries boss 26 and has a gasket 47 for sealing between cover 45 and housing 10 being secured thereto by screws 50. The cover 45 extends outwardly and forms a reservoir 51 which holds the oil which is impelled by plunger 36 and which serves to lubricate all parts. The reservoir 51 is capped by plate 52 which rests on bosses 53 to allow breathing. Plate 52 is secured by bolt 54 threadably engaged in boss 26 opposite screw 28.

The cover 45 has a plurality of holes 55 therein to permit fluid to pass freely into cavity 44. The housing 10 has a plurality of fluid passageways 56 establishing communication between the cavity 44 and the cavity 40. The liquid utilized in the apparatus may be of any noncompressible, lubricating-type, mineral oil with antifoam and extreme pressure additives being particularly suitable.

Figure 4:
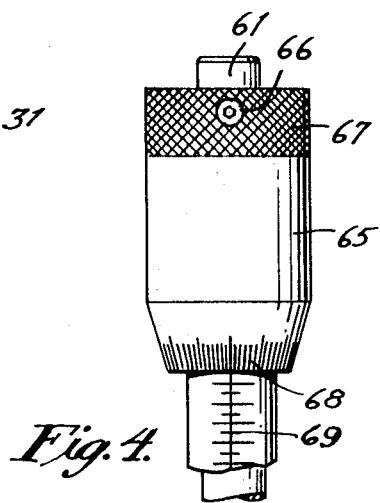
FIG. 4 is a fragmentary side view as seen from the line 4—4 of FIG. 1.

The housing 10 is provided with an adjustable crosshead stop assembly 60 which includes a shaft 61 engaging the slot 32 and surface 33 of crosshead 30 at any selected point to limit the travel of plunger 36 in bore 37 in one direction. The shaft 61 is carried in a hollow tube 62 which is in threaded engagement in housing 10 and is provided with an externally threaded portion 63 at its outer end. The shaft 61 may be provided with an O-ring 64 for sealing. An internally threaded collar 65 is attached to shaft 61 by set screw 66 and is in threaded engagement with portion 63 of tube 62. The collar 65 has an outer knurled surface for gripping and a plurality of vertical indicia lines 68 for reference for adjustment in relation to horizontal indicia lines 69 on tube 62, FIG. 4. The shaft 61 has a hollow bore 70 for part of its length and is shown here with a pointed rod 71 therein, which rod 71 bears against ball 72, forcing ball 72 outward through hole 73 in the side of shaft 61 to bear against tube 62 to provide resistance to rotation of shaft 61, depending on adjustment of setting screw 74 threadably engaged in the outer end of shaft 61.

The housing 38 is provided with a fluid passageway 76 communicating with cavity 40 and extending to threaded opening 77.

An adjustable safety valve assembly 78 is threadably engaged in opening 77 which assembly includes a body 79 having a central hollow bore 80 and an angularly related passageway 81 communicating with bore 80 and fluid passageway 76. The valve body has an integral valve seat 83 and a valve stem 82 with conical valve plug 82a free to move vertically within bore 80. Valve spring 84, surrounding stem 82 and bearing on top of valve plug 82a urges plug 82a to a closed position against seat 83, and adjusting nut 85, threadably engaged in valve body 79, permits of adjustment of the force of spring 84. Below the valve body 79, a passageway 88 is provided in housing 38 to communicate with bore 37 and the valve seating area, such arrangement allowing relief of excessive fluid pressure in bore 37.

Also below the valve body 79 in housing 38 is a passageway 86 communicating with cavity 40 and sealed by valve ball 87, which only opens to allow fluid replenishment in bore 37 when needed, being kept closed by pressure developed by plunger 36 on the discharge stroke and by pressure developed by spring 100 against diaphragm 95 on the suction stroke.

The diaphragm 95, of a flexible, chemically inert material, is performed hydrostatically to provide a circular groove just inside its clamped diameter which acts as a hinge to allow extended travel without developing excessive stresses, such as would occur if the diaphragm were of the flat conventional type.

The diaphragm 95 is located in a recessed circular portion 90 of housing 38 and is clamped around its edge in peripheral grooves 96 in housing 38 and end plate 97 to produce a multiple O-ring type of seal. End plate 97 is secured to housing 38 by a plurality of cap screws 91 and compresses the diaphragm 95 in grooves 96 to provide a leakproof seal.

A flat round plate 98 with integral shaft of smaller diameter 99 is located behind the diaphragm 95, and a spring 100 surrounding shaft 99 bears against plate 98 and the bottom of a circular recess 101 in end plate 97, constantly urging the hinged diaphragm 95 to its backwardsmost position in recess 90. The length of shaft 99 and depth of recess 101 are such that forward travel of diaphragm 95 is limited to a safe value and spring 100 cannot be overstressed.

The end plate 97 has recess 102 and passageways 103 to allow movement of diaphragm 95 and to allow pumped fluid to pass in through suction valve assembly 104 and out through discharge valve assembly 105. Action of these double ball check valves is well known to the art and need not be described.

The mode of operation will now be pointed out.

The drive apparatus (not shown) is activated and shaft 11 rotates worm 16 on a shaft 11 which rotates gear 18 and cam 25. The crosshead 30 at the right is then urged to the right by cam 25 and the plunger 36 is urged to the right by crosshead 30. Fluid in bore 37 is displaced by the plunger 36 and such fluid pressure is distributed equally over the unclamped area of diaphragm 95 moving it to the right and compressing spring 100. Any pumpage in recesses 101 and 102 and in passageways 103 in end plate 97 is displaced through discharge check valve assembly 105 whereas suction check valve assembly 104 remains closed.

The plunger 36 and crosshead 30 are returned by spring 41 as cam 25 rotates to its low spot. The diaphragm 95 moves to the left under the force of spring 100, discharge check valve assembly 105 closes and pumpage enters passageways in end plate 97 through suction check valve assembly 104. The cycle is repeated.

If after the diaphragm 95 has moved completely to the left and fluid is needed in bore 37, the pressure therein will be reduced and valve 87 will open and fluid will flow in until pressure is equalized in bore 37 and cavity 40 so that valve 87 will close.

If the pressure becomes excessive, such as a result of a blockage in the pump discharge line, then safety valve 78 will be opened and fluid will bypass into cavity 40.

It should be noted that the length of stroke of crosshead 30 and piston 36 will be varied by the position of shaft 61 and can be easily changed as desired, thereby varying the movement of diaphragm 95 and the volume of pumpage.

It should be further noted that the shape of the cam 25 can be so programmed that when a pair of crossheads, plungers, diaphragms etc. are mounted in a duplex arrangement, and their discharge streams are fed into a single outlet, the combined flow of pumpage will be nonfluctuating, since the instantaneous velocities of the plungers when on discharge stroke can be made to add to a constant value. This is the preferred program given to the cam surface, even when the pump is arranged as a simplex, since this particular cam program consumes 40 percent less input power than that consumed by a simple crank or eccentric drive doing the same amount of work output.

I claim:
1. A metering pump comprising
   a housing having a portion with a piston bore therein,
   a piston reciprocable in said bore,
   means for positively impelling said piston in one direction,
   resilient means for urging said piston in the opposite direction,
   means engaging said piston for varying the return stroke of said piston,
   means for supplying liquid to said bore, a preformed diaphragm secured at its periphery and having the remaining face thereof on one side thereof exposed in communication with said bore free from obstruction for direct application on the entire exposed face of fluid in said bore for impelling movement of said diaphragm in one direction, pressure responsive liquid return means connected to said bore operative to bypass liquid from said bore at any position of said diaphragm, said diaphragm having a pumping chamber bounded by the opposite face of said diaphragm, said bore and the space in said housing in communication with said impelling face having a liquid therein providing the sole operating connection between said bore and said impelling face, resilient means engaging said opposite face of said diaphragm and urging said diaphragm in opposition to the pressure on said one face thereof, and liquid intake and delivery valves connected to said pumping chamber for intake and delivery of liquid upon movement of said diaphragm.

2. A metering pump as defined in claim 10 in which said means for varying said return stroke has a manually adjustable portion exteriorly disposed with respect to said housing.

3. A metering pump as defined in claim 10 in which said excess liquid return means has a manually adjustable portion exteriorly disposed with respect to said housing.

4. A metering pump as defined in claim 1 in which movement limiting means is provided for said diaphragm for engagement by said one face.

5. A metering pump as defined in claim 1 in which said means for impelling said piston is a cam on a shaft in said housing.

6. A metering pump as defined in claim 1 in which said means for supplying liquid to said bore includes a liquid cavity in said housing, and a passageway having a nonadjustable, nonreturn valve therein connecting said cavity and said bore.

7. A metering pump as defined in claim 6 in which all cavity and said bore have excess liquid return means interposed therebetween.

8. A metering pump as defined in claim 1 in which said piston has a head portion, said housing has separable portions in one of which said bore is located and in another of which said piston head portion is located, said housing having fluid passageways providing communication from said liquid supplying means and said bore.

UNITED STATES PATENT OFFICE
CERTIFICATE OF CORRECTION

Patent No. 3,612,727          Dated October 12, 1971

Inventor(s) WILLIAM W. DRAKE

It is certified that error appears in the above-identified patent and that said Letters Patent are hereby corrected as shown below:

Column 1,

Line 36, after "other" the word "gages" should read - gases - .

Column 3,

Line 73, before "hydrostatically" the word "performed" should read - preformed - .

Column 5,

Line 22, after "claim" the number "10" should read - 1 - .

Column 6,

Line 1, after "claim" the number "10" should read - 1 - ,

Line 15, after "which" the word "all" should read - said - .

Signed and sealed this 4th day of April 1972.

(SEAL)
   Attest:

EDWARD M. FLETCHER, JR.          ROBERT GOTTSCHALK
Attesting Officer                Commissioner of Patents